United States Patent [19]

Mizuno et al.

[11] Patent Number: 4,532,902

[45] Date of Patent: Aug. 6, 1985

[54] METHOD OF AND SYSTEM FOR CONTROLLING IGNITION TIMING IN INTERNAL COMBUSTION ENGINE

[75] Inventors: Hiroshi Mizuno, Toyota; Hiroshi Ito, Nagoya, both of Japan

[73] Assignee: Toyota Jidosha Kabushiki Kaisha, Toyota, Japan

[21] Appl. No.: 606,967

[22] Filed: May 4, 1984

[30] Foreign Application Priority Data

May 6, 1983 [JP] Japan .................. 58-79010

[51] Int. Cl.³ .................. F02P 1/00; F02P 5/04; F02B 31/00
[52] U.S. Cl. .................. 123/417; 123/432; 123/415; 123/308
[58] Field of Search .............. 123/417, 416, 415, 308, 123/432

[56] References Cited

U.S. PATENT DOCUMENTS

| | | |
|---|---|---|
| 4,246,874 | 1/1981 | Nakagawa et al. .......... 123/432 |
| 4,271,795 | 6/1981 | Nakagawa et al. .......... 123/308 |
| 4,306,535 | 12/1981 | Fitzner .................. 123/415 |
| 4,318,387 | 3/1982 | Fitzner .................. 123/415 |
| 4,340,021 | 7/1982 | Oshiage et al. .......... 123/415 |
| 4,380,981 | 4/1983 | Enoshima et al. ......... 123/415 |
| 4,408,583 | 10/1983 | Merrick ................. 123/415 |
| 4,448,179 | 5/1984 | Foster .................. 123/415 |

*Primary Examiner*—Raymond A. Nelli
*Attorney, Agent, or Firm*—Finnegan, Henderson, Farabow, Garrett & Dunner

[57] ABSTRACT

A method and a system is disclosed for controlling ignition timing in an internal combustion engine having a throttle valve and an intake air control valve independent of said throttle valve. Ignition timing is controlled in synchronism with the on-off operation of the intake air control valve. A change in the ignition timing is delayed by a predetermined period of time corresponding to a delay time in completing the on-off operation of the intake air control valve so that the optimum ignition timing is obtained at the proper time.

6 Claims, 8 Drawing Figures

METHOD OF AND SYSTEM FOR CONTROLLING IGNITION TIMING IN INTERNAL COMBUSTION ENGINE

BACKGROUND OF THE INVENTION

1. Field of the Invention

This invention relates to a method of and system for controlling ignition timing in an internal combustion engine, and particularly to improvements in a method of and a system for controlling ignition timing in an internal combustion engine, suitable for use in an engine of a motor vehicle provided with an intake-air-pressure-sensing type of an electronic ignition timing control device, and in which a throttle valve and an intake air control valve independent of the throttle are used, and ignition timing is controlled in accordance with the engine operating conditions.

2. Description of the Prior Art

As one of the methods of controlling intake air fed to combustion chambers of an internal combustion engine, such as a motor vehicle engine, a throttle valve is used for controlling the total flowrate of intake air fed to the combustion chambers, and an intake air control valve is controlled in accordance with the engine operating conditions, for controlling part of the intake air (See, e.g., U.S. Pat. No. 4,246,874 and U.S. Pat. No. 4,271,795). The above-described internal combustion engine provided with the throttle valve and the intake air control valve independent of the throttle valve features that, in accordance with the engine operating conditions, during low speed rotation of the engine, for which a comparatively low intake air is required for example, the intake air control valve is closed to increase the velocity of flow of the intake air, so that the combustion in the combustion chambers can be carried out smoothly, whereas, during high speed rotation of the engine, the aforesaid intake air control valve is opened to quickly feed a required intake air flowrate to the combustion chambers, whereby the high speed rotation is carried out smoothly, so that the low speed operating performance and the high speed operating performance of the engine can be compatible.

Additionally, as one of the methods of controlling ignition timing of an internal combustion engine such as a motor vehicle engine, an electronic ignition timing control system has been used. According to this method, the ignition timing is electronically controlled in accordance with the engine operating conditions, so that an air-fuel mixture can be ignited at a predetermined ignition timing.

In consequence, in providing the aforesaid electronic ignition timing control system on the engine having the aforesaid intake air control valve, the ignition timing has heretofore been determined in accordance with engine load detected from intake pressure of the engine, for example, in the same manner as in the engine having only the ordinary throttle valve. However, the internal combustion engine having such intake air control valve has operated at a disadvantage because, even if the apparent engine load, i.e. intake air pressure, is the same, there are cases in which required ignition timings are varied depending on whether the intake air control valve is opened as indicated by a broken line A or the intake air control valve is closed as indicated by a one-dot chain line B in FIG. 1. Consequently, as against the above, if a single ignition timing is set as indicated by a solid line as C in the past, then the ignition timing satisfying the requirement cannot be obtained. This is particularly true of the intake-air-pressure sensing type of an electronic ignition timing control system for detecting the engine load from the intake air pressure.

In order to obviate the above-described disadvantage, it is conceivable to change to set ignition timing in accordance with the on-off conditions of the intake air control valve (See e.g. Japanese Laid-Open No. 48776/83). However, if the set ignition timing is changed in response to a change-over command for the intake air control valve, then, as shown in FIG. 2, there is a possibility of a discrepancy in timing, as shown in a comparative example as indicated by broken line E, because a certain period of time Td is required until the opening degree of the intake air control valve is actually varied, the conditions of combustion are changed and the required ignition timing indicated by a solid line D is varied, after the mechanical operation of the intake air control valve has been started. In consequence, in the case of the comparative example shown in FIG. 2, for example, the ignition timing is excessively advanced to cause knocking because the required ignition timing is set at the time when the intake air control valve is opened regardless that the conditions of combustion are still varying.

SUMMARY OF THE INVENTION

The present invention has been developed to obviate the above-described disadvantages of the prior art and has as its first object the provision of a method of controlling ignition timing in an internal combustion engine, in which suitable ignition timing corresponding to the on-off conditions of an intake air control valve can be obtained, and the ignition time can be changed at a suitable timing irrespective of a delay in the on-off operation of the intake air control valve.

The present invention has as its second object the provision of a method of controlling ignition timing in an internal combustion engine, in which respective control programs for the on-off control of the intake air control valve and the change in the ignition timing can be simplified.

The present invention has as its third object the provision of a method of controlling ignition timing in an internal combustion engine, in which both the on-off control of the intake air control valve and the change of the ignition timing can be carried out by a single control program.

The present invention has as its fourth object the provision of a method of controlling ignition timing in an internal combustion engine, in which the change of the ignition timing according to the on-off conditions of the intake air control valve can be very easily carried out.

The present invention has as its fifth object the provision of a method of controlling ignition timing in an internal combustion engine, in which a precise ignition timing according to the on-off conditions of the intake air control valve can be easily obtained.

The present invention has as its sixth object the provision of a method of controlling ignition timing in an internal combustion engine, in which ignition timing according to the on-off conditions of the intake air control valve can be easily obtained.

The present invention has as its seventh object the provision of a system for controlling ignition timing in an internal combustion engine, in which the first, second, fourth and sixth objects can be achieved.

The present invention has as its eighth object the provision of a system for controlling ignition timing in an internal combustion engine, in which the first, third and fifth objects can be achieved.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the above-described first object and in accordance with the purpose of the invention as embodied and broadly described herein, the present invention provides a method of controlling an ignition timing in an internal combustion engine, having a throttle valve and an intake air control valve independent of the throttle valve in which the ignition timing is controlled in synchronism with the operation of the intake air control valve, comprising determining whether or not there exist conditions where said intake air control valve is to be on-off operated;

controlling the operation of said intake air control valve is to be on-off operated;

delaying a change in the timing of the ignition timing by a predetermined period of time corresponding to a delay time in completing the on-off operation of intake air control valve; and changing the ignition timing in accordance with the on-off condition of the intake air control valve upon the end of the predetermined period of time.

To achieve the above-described second object, the present invention contemplates that the change of the ignition timing is effected in accordance with the conditions of an on-off control signal to the intake air control valve.

To achieve the above-described third object, the present invention contemplates that the change of the ignition timing is effected simultaneously with the on-off control of the intake air control valve.

To achieve the above-described fourth object, the present invention contemplates that the change of the ignition timing according to the on-off conditions of the intake air control valve is effected by the addition or subtraction of a predetermined value to a set ignition timing.

To achieve the above-described fifth object, the present invention contemplates that the change of the ignition timing according to the on-off conditions of the intake air control valve is effected by the change of a map of a set ignition timing.

To achieve the above-described sixth object, a set ignition timing when the intake air control valve is opened is more advanced than the set ignition timing when the intake air control valve is closed.

To achieve the above-described seventh object and in accordance with the purpose of the invention as embodied and broadly described herein, the present invention provides system for controlling an ignition timing in an internal combustion engine having:

a throttle valve for controlling the flowrate of intake air;

an intake air pressure sensor for sensing intake air pressure;

injectors provided in a main intake passage, for injecting pressurized fuel to intake ports of respective cylinders of the engine;

an intake air control valve provided in an auxiliary intake passage, for opening or closing the auxiliary intake passage in accordance with the engine operating conditions;

an intake air control actuator for on-off operating the intake air control valve between on and off positions;

spark plugs for igniting an air-fuel mixture taken into the combustion chambers of the engine;

a crank angle sensor for sensing the crank angles of the engine; and an electronic control unit for determining the setting of the ignition timing in accordance with at least an engine load sensed from an intake air pressure and an engine rotational speed obtained from an output from the crank angle sensor to emit an ignition signal so that the ignition can be effected at a set ignition timing, and for feeding control signals to at least the injectors and the intake air control actuator in accordance with the engine operating conditions, and, advancing or delaying the ignition timing by a predetermined value in synchronism with the on-off control signals applied to the intake air control actuator after a delay of a predetermined period of time corresponding a delay time in completing the on-off operation of the intake air control valve.

To achieve the above-described eighth object and in accordance with the purpose of the invention as embodied and broadly described herein, the present invention provides a system for controlling ignition timing in an internal combustion engine comprising:

a throttle valve for controlling the flowrate of intake air;

an intake air pressure sensor for sensing intake air pressure;

injectors provided in a main intake passage, for injecting pressurized fuel to intake ports of respective cylinders of the engine;

an intake air control valve provided in an auxiliary intake passage, for opening or closing the auxiliary intake passage in accordance with the engine operating conditions;

an intake air control actuator for operating the intake air control valve between on and off positions;

spark plugs for igniting an air-fuel mixture taken into combustion chambers of the engine;

a crank angle sensor the sensing a crank angles of the engine; and an electronic control unit for determining the setting of ignition timing in accordance with at least an engine load sensed from an intake air pressure fed from said intake air pressure sensor and an engine rotational speed obtained from an output from the crank angle sensor to emit an ignition signal so that the ignition can be effected at a set ignition timing, and for feeding control signals to at least the injectors and said intake air control actuator in accordance with the engine operating conditions, and selecting a map of ignition timing after a delay of a predetermined period of time corresponding to a delay time in completing the operation of the intake air control valve when an on-off control signal is fed to said intake air control actuator.

According to the present invention, in the conditions where the intake air control valve is required to be on-off operated, the intake air control valve is on-off operated, and thereafter, a change in the ignition timing is delayed by a predetermined period of time in accordance with a delay time of the operation of the intake air control valve, so that a suitable ignition timing according to the on-off operations of the intake air control valve is obtained at the proper time. More specifically, an ignition timing being in accord with required ignition timings (indicated by a broken line A and a one-dot chain line B) variable in accordance with the on-off conditions of the intake air control valve is set as shown in FIG. 1 for example, so that a further precise ignition timing control can be effected. Furthermore, when the ignition timing is varied in accordance with the change in the conditions of the intake air control valve, a deviation in time can be eliminated between a time where the required ignition timing (a solid line D) is varied in accordance with the change in the conditions of the intake air control valve and a time where the set ignition timing is changed as indicated by a one-dot chain line F in FIG. 2, so that the ignition timing fitting in with the required ignition timing can be precisely obtained. In consequence, knocking and the like at the time of changing the position of the intake air control valve can be prevented.

BRIEF DESCRIPTION OF THE DRAWINGS

The principles of this invention, as well as other objects and advantages thereof, will be explained in the following specification relating to the accompanying drawings, in which like reference characters designate the same or similar parts throughout the figures thereof and wherein.

DETAILED DESCRIPTION OF THE INVENTION

Detailed description will hereunder be given of embodiments of the motor vehicle engine provided with the intake-air-pressure-sensing type of an electronic ignition timing control system, to which is applied the method of controlling an ignition timing in an internal combustion engine according to the present invention, with reference to the drawings.

Figure 1:
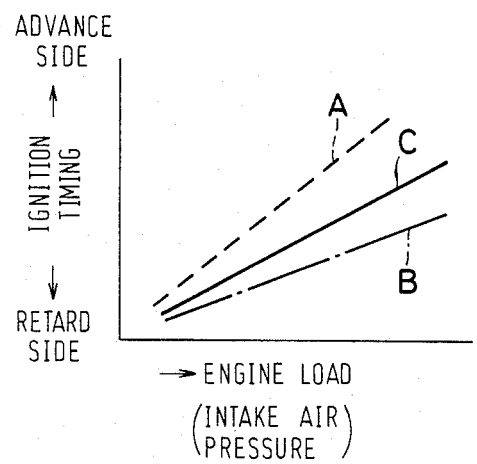
FIG. 1 is a chart showing an example of the relationship between the required ignition timing and the set ignition timing when the intake air control valve is opened and closed in the conventional internal combustion engine having the intake air control valve.
Figure 2:
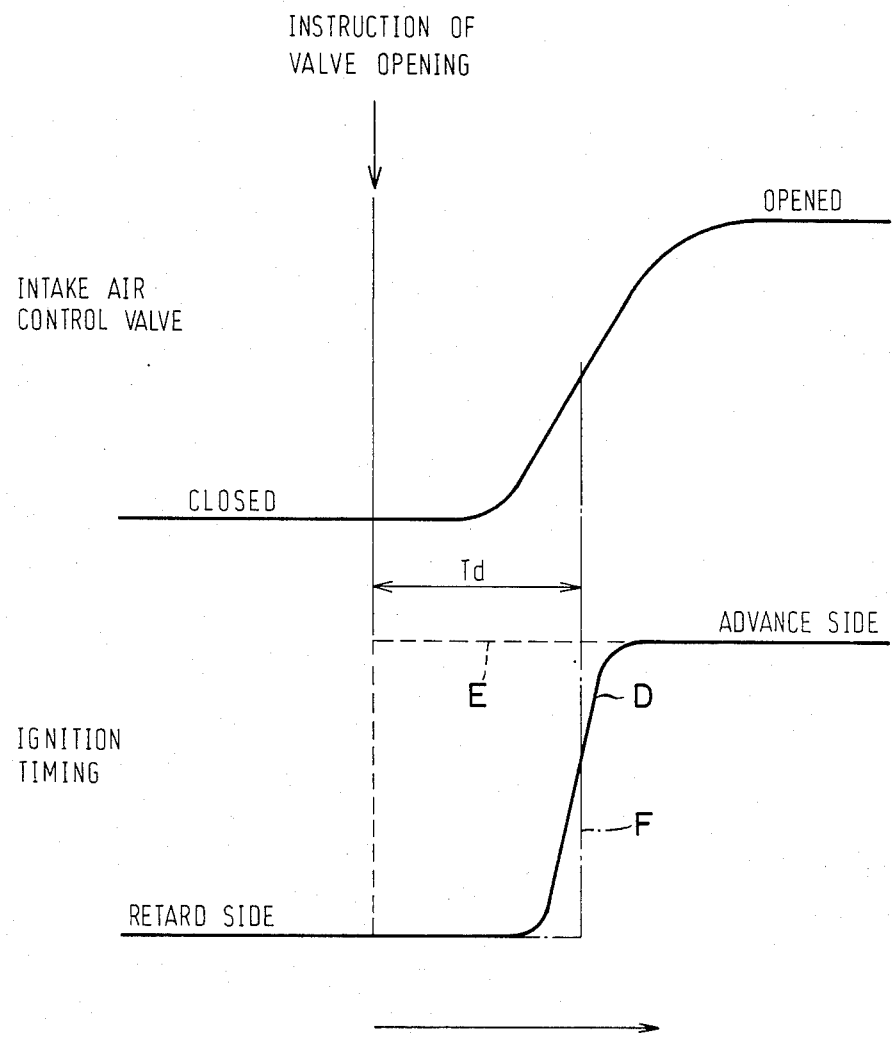
FIG. 2 is a chart showing in comparison the relationship between the conditions of the intake air control valve, the required ignition timing and the change-over timing of the set ignition timing in a compared example and an embodiment of the present invention.
Figure 3:
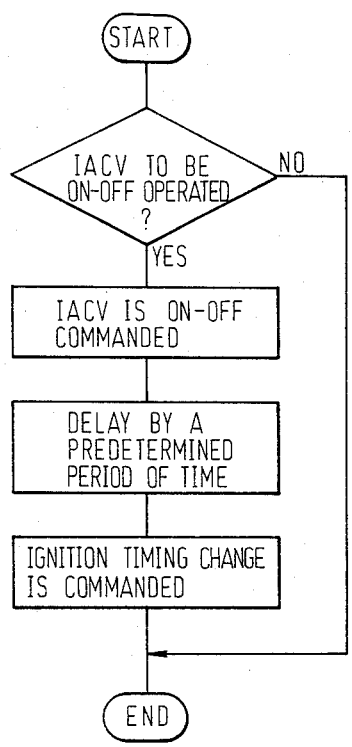
FIG. 3 is a flow chart showing the gist of the method of controlling the ignition timing in an internal combustion engine according to the present invention.
Figure 4:
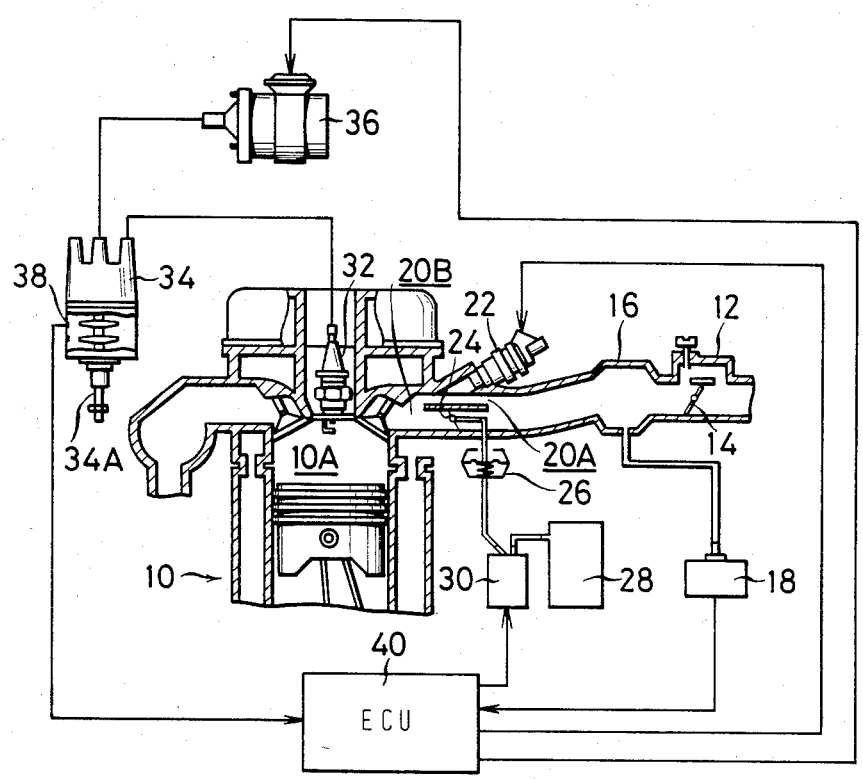
FIG. 4 is a sectional view, partially including a block diagram, showing the general arrangement of a first embodiment of a motor vehicle engine provided with an electronic ignition timing control system, to which the present invention is applied.

As shown in FIG. 4, and in accordance with the first embodiment of the present invention, there is provided: a throttle valve 14 on a throttle body 12, adapted to be on-off operated in association with an accelerator pedal, not shown, provided at a driver's seat, for controlling the total flowrate of intake air; and a surge tank 16 is also provided for preventing intake air interference. An intake air pressure sensor 18 for sensing intake air pressure is connected to the surge tank 16. Injectors 22 are connected into one intake passage 20A (hereinafter referred to as a "main intake passage") the latter establishing communication between the surge tank 16 and the intake port of the engine 10. The injectors are used for injecting pressurized fuel to intake ports of respective cylinders.

An intake air control valve (hereinafter referred to as an "IACV") 24 is provided in the other intake passage 20B (hereinafter referred to as an "auxiliary intake passage"), the latter establishing communication between the surge tank 16 and the intake ports of the engine 10. The IACV provides on-off operation of the auxiliary intake passage 20B in accordance with the engine operating conditions. An intake air control actuator (hereinafter referred to as an "IACA") 26 operates under a vacuum, and provides on-off operation of the IACV 24. A vacuum switching valve 30 feeds vacuum or atmospheric air from a vacuum tank 28 to the IACA 26.

Spark plugs 32 are provided for igniting the air-fuel mixture taken into combustion chambers 10A of the engine. A distributor 34 has a distributor shaft 34A rotatable in association with the rotation of a crankshaft of the engine 10. Distributor 34 generates an ignition primary signal and distributes an ignition secondary signal of high voltage, generated in an ignition coil 36 in response to the ignition primary signal, to the spark plugs 32 of the respective cylinders. A crank angle sensor 38 incorporated in the distributor 34 for detects the crank angle of the engine 10 from the rotating conditions of the distributor shaft 34A. An electronic control unit (hereinafter referred to as an "ECU") 40 determines a set ignition timing in accordance with engine load sensed from intake air pressure from the intake air pressure sensor 18 and an engine rotational speed obtained from the output of the crank angle sensor 38. The ECU feeds feeding an ignition signal to the ignition coil 36 so that ignition can be effected at the set ignition timing, and feeds control signals to the injectors 22, the vacuum switching valve 30 and the like in accordance with the engine operating conditions.

Figure 5:
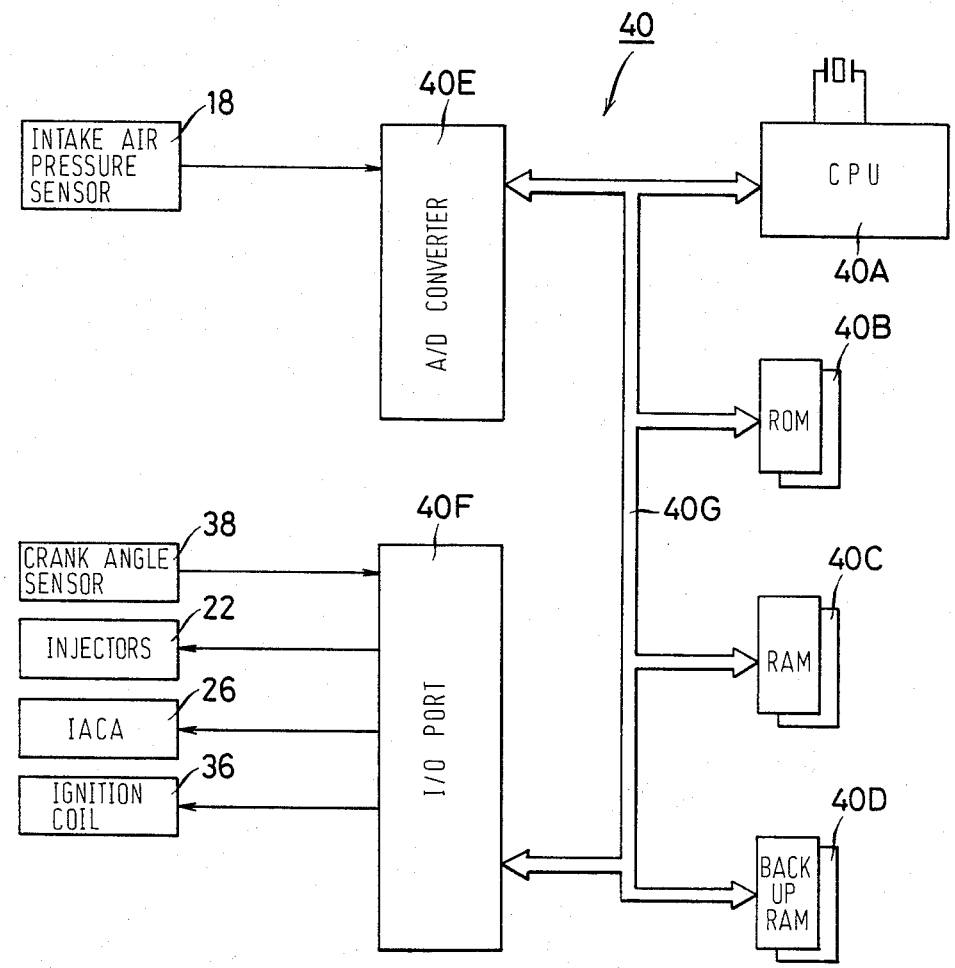
FIG. 5 is a block diagram showing the arrangement of an electronic control unit used in the first embodiment.

As shown in FIG. 5 in detail, the ECU 40 as embodies herein comprises a central processing unit (hereinafter referred to as a "CPU") 40A consisting of a microprocessor for example, for carrying out various processing operations; and a read only memory (hereinafter referred to as a "ROM") 40B for storing control programs, various data and the like. ECU 40 also embodies a random access memory (hereinafter referred to as a "RAM") 40C for temporarily storing operational data in the CPU 40A and the like; a backup RAM 40D capable of holding the memory by being fed with power from an auxiliary power source even when the engine is stopped; an analogue-digital converter (hereinafter referred to as an "A/D converter") 40E which is provided with a multiplexer function for converting an analogue signal fed from the intake air pressure sensor 18 or the like to a digital signal and successively taking the analogue signal in; an input/output port (hereinafter referred to as an "I/O port") 40F which provides a buffer function for taking in a digital signal fed from the crank angle sensor 38 or the like and feeding control signals to the injectors 22, the IACA 26, the ignition coil 36 and the like in accordance with the results of calculation in the CPU 40A; and a common bus 40G for connecting the above-described components to one another to transmit data and commands.

Description will now be given of the operation of the first embodiment.

Figure 6:
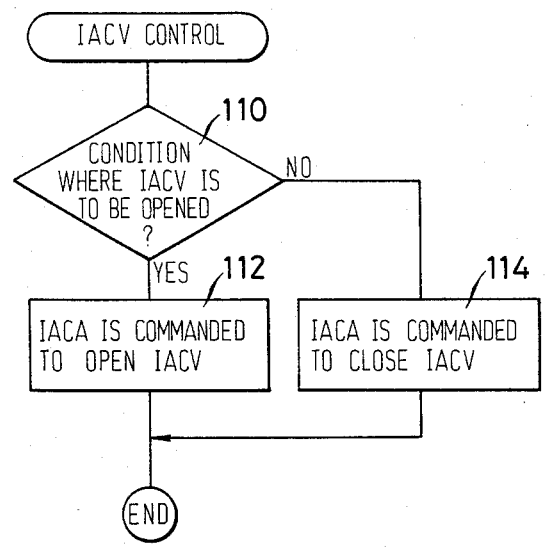
FIG. 6 is a flow chart showing the routine for on-off control of the intake air control valve in the first embodiment.

The on-off control of the IACV 24 in this embodiment is carried out by the same intake air control valve control routine as before as shown in FIG. 6. More specifically, in Step 110, it is determined whether or not there exist conditions where the IACV 24 is to be opened in accordance with the engine operating conditions. If the result of this determination is positive, then the routine proceeds to Step 112, where a control signal to open the IACV 24 is fed to the IACA 26, and this routine is ended.

On the other hand, if the result of this determination in the aforesaid Step 110 is negative, then the routine proceeds to Step 114, where a control signal to close the intake air control valve 24 is fed to the IACA 26, and this routine is ended.

Figure 7:
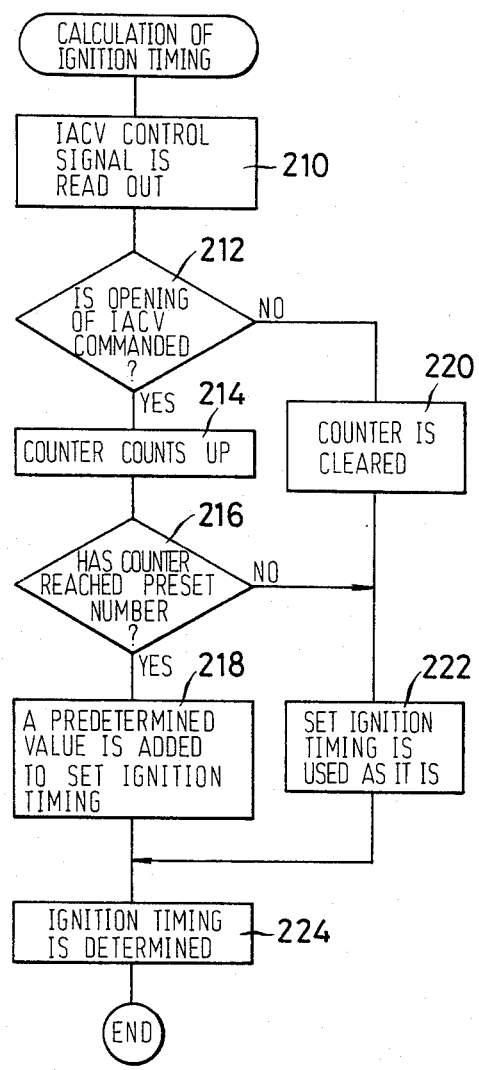
FIG. 7 is a flow chart showing the routine for calculating the ignition timing in response to an intake air control valve control signal in the first embodiment.

The calculation in accordance with the conditions of the on-off control signal to the IACV 24 emitted according to the IACV control routine shown in the aforesaid FIG. 6 is carried out by the routine shown in FIG. 7. More specifically, in Step 210, an IACV control signal is read out. Subsequently, the routine proceeds to Step 212, where it is determined whether or not the IACV has been commanded to be opened by the IACV control signal. If the result of this determination is positive, then the routine proceeds to Step 214, where a counter counting the elapsed time after the on-off operation of the IACV 24 is caused to count up by one. Subsequently, the routine proceeds to Step 216, where it is determined whether or not the counter has reached a preset number, i.e., a predetermined period of time corresponding to a delay time of the operation has elapsed after the on-off operation of the IACV 24. If the result of this determination is positive, then the routine proceeds to Step 218, where a predetermined value is added to the set ignition timing suitable for the time when the IACV 24 is closed to thereby advance the ignition timing.

On the other hand, if the result of the determination in the aforesaid Step 212 is negative, then the routine proceeds to Step 220, where the aforesaid counter is cleared. After the end of Step 220 or when the result of a determination in the aforesaid Step 216 is negative, the routine proceeds to Step 222, where the set ignition timing suitable for the time when the intake air control valve 24 is closed is used as it is.

After the end of Step 218 or 222, the routine proceeds to Step 224, where the ignition timing is determined and this routine is ended.

In this embodiment, the change of the ignition timing is effected in accordance with the conditions of the on-off control signal to the IACV, so that the respective control programs can be simplified.

Detailed description will hereunder be given of the second embodiment of the motor vehicle engine provided with intake-air-pressure-sensing-type of an electronic ignition timing control system, to which is applied the method of controlling ignition timing in an internal combustion engine according to present invention.

Figure 8:
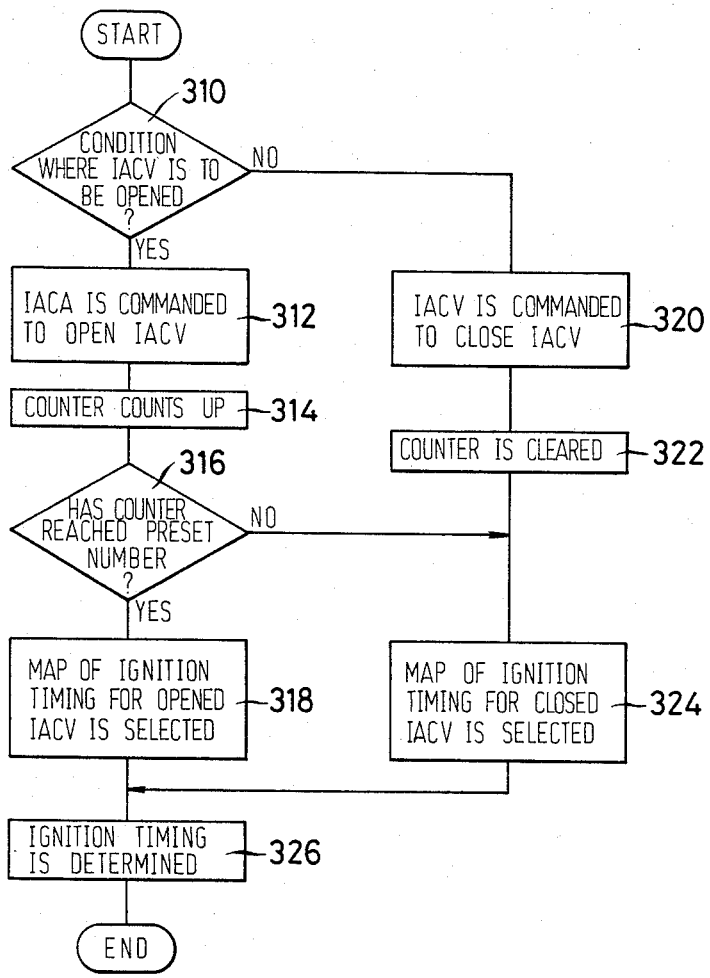
FIG. 8 is a flow chart showing the routine for on-off control of the intake air control valve in accordance with the engine operating conditions and calculating the ignition timing in accordance with the on-off control of the intake air control valve for use in a second embodiment of a motor vehicle engine provided with an electronic ignition timing control device, to which is applied the method of controlling the ignition timing in an internal combustion engine according to the present application.

According to this embodiment, in the motor vehicle engine having the throttle body 12, throttle valve 14, surge tank 16, intake air pressure sensor 18, main intake passage 20A, auxiliary intake passage 20B, injectors 22, IACV 24, IACA 26, vacuum tank 28, vacuum switching valve 30, spark plugs 32, distributor 34, ignition coil 36, crank angle sensor 38, ECU 40 and the like, all of which are similar to those in the above-described first embodiment as shown in the aforesaid FIGS. 4 and 5, the processing shown in FIG. 8 is carried out.

Since the respect other than the above are similar to those in the first embodiment, detailed description will be omitted.

The on-off control of the IACV 24 and the change of the ignition timing corresponding thereto in this second embodiment are carried out by the routine shown in FIG. 8. More specifically, firstly, in Step 310, it is determined whether or not there exist conditions where the IACV 24 is to be opened in accordance with the engine operating conditions. If the result of this determination is positive, then the routine proceeds to Step 312, where a control signal to open the IACV 24 is fed to the IACA 26. Subsequently, the routine proceeds to Step 314, where a counter counting the elapsed time after the on-off operation of the IACV 24 is caused to count up by one. Subsequently, the routine proceeds to Step 316, where it is determined whether or not the counter has reached a preset number, i.e. a predetermined period of time corresponding to a delay time of the operation has elapsed after the on-off operation of the IACV. If the result of this determination is positive, then the routine proceeds to Step 318, where a map of the set ignition timing suitable for the time when the IACV 24 is opened is selected.

On the other hand, if the result of judgment in the aforesaid Step 310 is negative, i.e. when there exist no conditions where the IACV 24 is to be opened, the routine proceeds to Step 320, where a control signal to close the IACV 24 is fed to the IACA 26. Subsequently, the routine proceeds to Step 322, where the aforesaid counter is cleared. After the end of Step 322, or when the result of the determination of the aforesaid Step 316 is negative, the routine proceeds to Step 324, where a map of the set ignition timing suitable for the time when the IACV is closed is selected.

After the end of Step 318 or 324, the routine proceeds to Step 326, where the ignition timing is determined and this routine is ended.

In this embodiment, the change of ignition timing is effected together with the on-off control of the IACV 24, so that the on-off control of the IACV 24 and the change of ignition timing can be carried out by a single control program.

As to which is used, the first embodiment or the second embodiment, it is desirable to properly use either one or the other depending on the conditions of other control programs and the storage capacities of the memories.

Additionally, in the above embodiments, the ignition timing when the IACV 24 is opened is more advanced than the ignition timing when the IACV 24 is closed, however, the relationship therebetween need not necessarily be limited to this, and an inverted case may be adopted depending on the characteristics required of the engine.

In each of the above embodiments, the present invention has been applied to the electronically controlled fuel injection type motor vehicle engines, however, it is clear that the scope of application of the present invention need not necessarily be limited to this, and the present invention is applicable to ordinary engines as well.

What is claimed is:

1. A method for controlling ignition timing in an internal combustion engine having a throttle valve and an intake air control valve independent of said throttle valve, in which the ignition timing is controlled in synchronism with the operation of the intake air control valve, comprising:
   determining whether or not there exist conditions where said intake air control valve is to be on-off operated;
   controlling the operation of said intake air control valve when it is determined there exists a condition where said intake air control valve is to be on-off operated;
   delaying a change in the timing of the ignition timing by a predetermined period of time corresponding to a delay time in effecting the on-off operation of said intake air control valve; and
   changing the ignition timing in accordance with the on-off condition of said intake air control valve upon the end of said predetermined period of time.

2. A method of controlling ignition timing in an internal combustion engine as set forth in claim 1, wherein the change of ignition timing is effected simultaneously with the on-off control of said intake air control valve.

3. A method of controlling ignition timing in an internal combustion engine as set forth in claim 1, wherein the step of changing the ignition timing according to the on-off condition of said intake air control valve includes adding a predetermined value to or subtracting the same from a set ignition timing.

4. A method of controlling ignition timing in an internal combustion engine as set forth in claim 1, wherein the step of changing the ignition timing according to the on-off condition of said intake air control valve includes selecting a map of ignition timing.

5. A system for controlling ignition timing in a combustion engine comprising:
   a throttle valve for controlling the flowrate of intake air;
   an intake air pressure sensor for sensing intake air pressure;
   injectors provided in a main intake passage, for injecting pressurized fuel to intake ports of respective cylinders of the engine;
   an intake air control valve provided in an auxiliary intake passage, for opening or closing said auxiliary intake passage in accordance with the engine operating conditions;
   an intake air control actuator for operating said intake air control valve between on and off positions;
   spark plugs for igniting an air-fuel mixture taken into the combustion chambers of the engine;
   a crank angle sensor for sensing the crank angles of the engine; and
   an electronic control unit for determining the setting of the ignition timing in accordance with at least an engine load sensed from an intake air pressure fed from said intake air pressure sensor and an engine rotational speed obtained from an output from said crank angle sensor to emit an ignition signal so that the ignition can be effected at a set ignition timing, and for feeding control signals to at least said injectors and said intake air control actuator in accordance with the engine operating conditions, and advancing or delaying the ignition timing by a predetermined value in synchronism with the on-off control signals applied to said intake air control actuator after a delay of a predetermined period of time corresponding to a delay time in effecting the on-off operation of said intake air control valve.

6. A system for controlling ignition timing in an internal combustion engine comprising:
   a throttle valve for controlling the flowrate of intake air;
   an intake air pressure sensor for sensing intake air pressure;
   injectors provided in a main intake passage, for injecting pressurized fuel to intake ports of respective cylinders of the engine;
   an intake air control valve provided in an auxiliary intake passage, for opening or closing said auxiliary intake passage in accordance with the engine operating conditions;
   an intake air control actuator for operating said intake air control valve between on and off positions;
   spark plugs for igniting an air-fuel mixture taken into the combustion chambers of the engine;
   a crank angle sensor for sensing the crank angles of the engine; and
   an electronic control unit for determining the setting of the ignition timing in accordance with at least an engine load sensed from an intake air pressure fed from said intake air pressure sensor and an engine rotational speed obtained from an output from said crank angle sensor to emit an ignition signal so that the ignition can be effected at a set ignition timing, and for feeding control signals to at least said injectors and said intake air control actuator in accordance with the engine operating conditions, and selecting a map of ignition timing after a delay of a predetermined period of time corresponding to a delay time in effecting the operation of the intake air control valve when an on-off control signal is fed to said intake air control actuator.

* * * * *